United States Patent [19]

Fletcher et al.

[11] 3,800,224

[45] Mar. 26, 1974

[54] AUTOMATIC FREQUENCY CONTROL FOR F. M. TRANSMITTER

[76] Inventors: James C. Fletcher, Administrator of the National Aeronautics and Space Administration with respect to an invention of; Martial A. Honnell, Auburn, Ala.

[22] Filed: Feb. 20, 1973

[21] Appl. No.: 333,912

[52] U.S. Cl. .................................. 325/148, 178/7.1
[51] Int. Cl. ............................................. H04b 1/04
[58] Field of Search ....... 179/69.5 TV; 325/45, 148, 325/159, 184, 187; 178/5.8 AF, 7.1, 7.2

[56] References Cited

UNITED STATES PATENTS 3,137,816 6/1964 McLin et al. ........................ 325/148

*Primary Examiner*—Albert J. Mayer
*Attorney, Agent, or Firm*—L. D. Wofford; G. J. Porter; J. R. Manning

[57] ABSTRACT

An automatic frequency control circuit for an F.M. television transmitter in which the frequency of the transmitter is sampled during what is termed the "back porch" portion of the horizontal synchronizing pulse which occurs during the retrace interval, the frequency sample compared with the frequency of a reference oscillator, and a correction applied to the frequency of the transmitter during this portion of the retrace interval.

7 Claims, 2 Drawing Figures

AUTOMATIC FREQUENCY CONTROL FOR F. M. TRANSMITTER

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to automatic frequency control systems for radio transmitters and particularly to a system adapted to control the frequency of a frequency modulation, F.M., transmitter employed to transmit television or other signals having recurring periods of fixed frequency operation.

GENERAL DESCRIPTION OF THE PRIOR ART

Commercial television transmitters generally employ amplitude modulation to apply the picture information to the carrier and since in such systems the carrier signal is generated by a very accurately controlled crystal oscillator, carrier frequency control is not a substantial problem. On the other hand there are applications, particularly in microwave television links and in industrial, space and military fields wherein it is sometimes desirable to employ frequency modulation for the transmission of video signals. In such cases, since the frequency determing oscillator must necessarily be variable in frequency and thus not inherently stable, there exists the problem of controlling the frequency of the F.M. carrier in some manner which will assure that a given modulation signal will always produce the same output frequency. The problem becomes particularly difficult for television signals and where transmission frequencies are in or above the ultra-high-frequency range.

The well-known techniques used to control the frequency of frequency modulated transmitters modulated with audio frequency signals compare the average frequency of the transmitter with a stable frequency produced by a crystal oscillator. A correction signal derived from the difference between the average frequency of the transmitter and that of the crystal oscillator is used to correct the frequency of the transmitter. This can be done because the average value of the modulating audio frequency signal is zero, that is, the audio frequency signal does not contain a DC component.

A television, or video, signal contains a varying DC component proportional to the brightness information in the scene televised. The difficulty of transmitting the DC component and, at the same time, maintaining the frequency of the transmitter within its assigned channel has, in the prior art, led to the design of FM television transmitters without direct crystal control of the frequency.

These transmitters used open-loop systems with voltage-controlled oscillators carefully temperature-compensated for the required frequency stability. This compensation process is slow, and the open-loop system provides no protection against frequency drift caused by aging effects. Another scheme used is to up-convert the output signal of the frequency modulated oscillator by mixing it with a crystal-controlled high-frequency signal. This system reduces the percent error in the output frequency, but it is subject to aging drifts and presents modulation linearity problems when wide frequency deviation is required.

SUMMARY OF THE INVENTION

Accordingly, it is the object of this invention to provide an automatic frequency control capable of very closely regulating the frequency of an F.M. television transmitter employing a stable reference source.

In accordance with this invention the frequency of a transmitter which generates a signal having a known recurring reference frequency, such as a video signal, is sampled during the recurring frequency portion of the signal. This signal, or as converted to a selected lower frequency signal, is fed to a discriminator together with a fixed reference frequency from a crystal-controlled oscillator with respect to which the transmitter is to be controlled in frequency. The transmitter signal and fixed reference signal are alternately processed by the discriminator by an electronic switch which causes the transmitter signal to be sampled during periods of the recurring reference frequency signal and the fixed reference signal to be sampled between such periods. During the discrimination of one of the two signals, the discriminator output is stored. Thereafter, and during the discrimination of the other signal, the discriminator output is connected in series with the previously stored output in such a manner that a voltage representative of the difference of the discriminator output is obtained. This difference is representative of the error in transmitter frequency and is applied back to the transmitter during the reference frequency period and employed to correct the frequency of the transmitter. The result is that the frequency of the transmitter is held to a very small percentage of error.

DESCRIPTION OF THE PREFERRED EMBODIMENT

Figure 1:
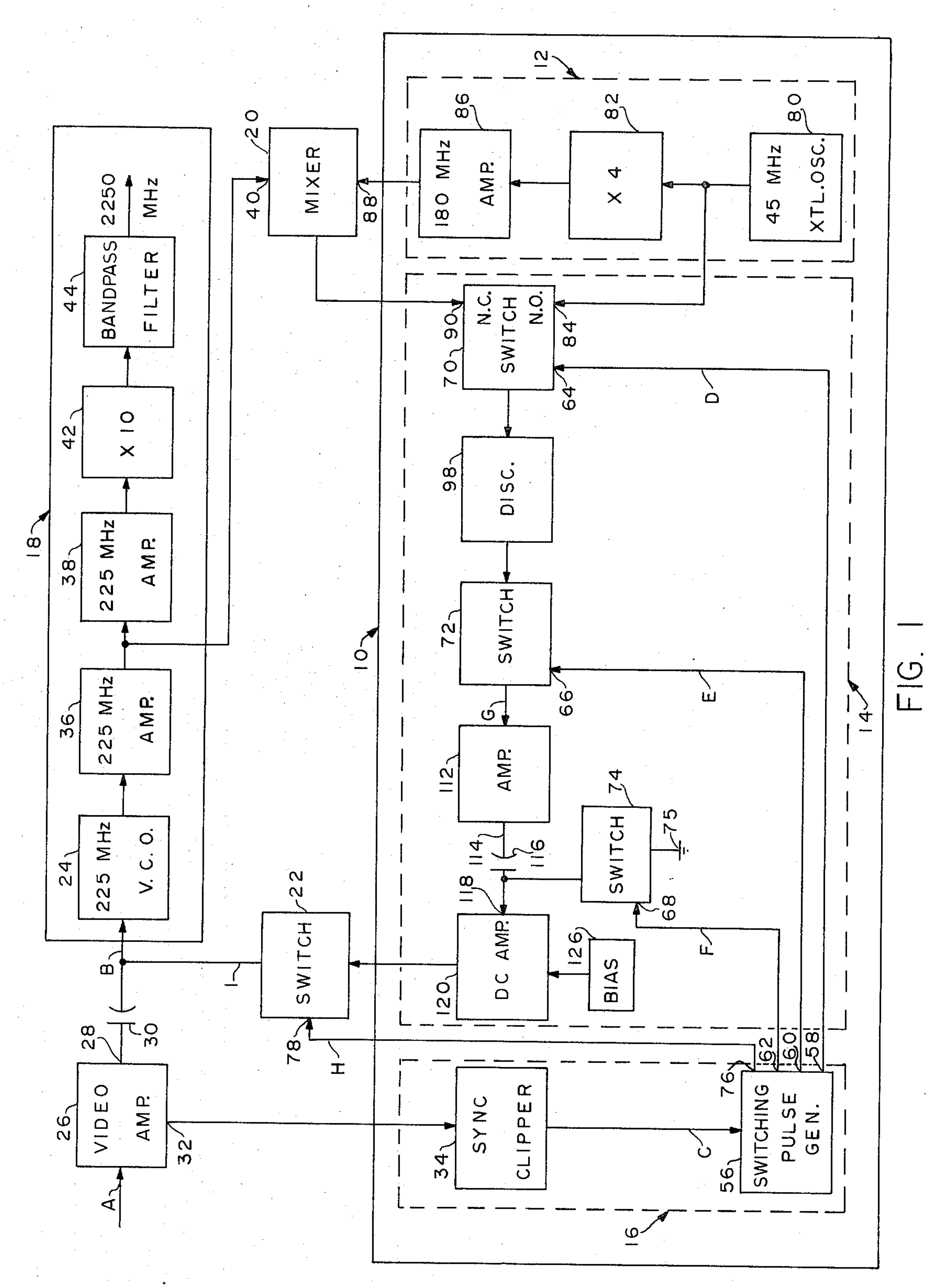
FIG. 1 is an electrical block diagram of an embodiment of the invention.

Referring to the drawings, automatic frequency control 10, as shown in FIG. 1, includes crystal oscillator reference 12, error corrector 14 and control 16, which are interconnected to sample the quiescent carrier frequency of FM transmitter 18, through mixer stage 20, and apply an appropriate correction, through switch 22, to voltage controlled oscillator 24 of transmitter 18.

A source of video, having scanning rate and sync standards similar to those required for commercial broadcasting, is coupled to the input of video amplifier 26. One output 28 of video amplifier 26 is coupled through capacitor 30 to the input of 225 MHz voltage controlled oscillator 24 of transmitter 18, and to the output of switch 22. A second output 32 of video amplifier 26 is coupled to the input of sync clipper 34 of control 16.

Figure 2:
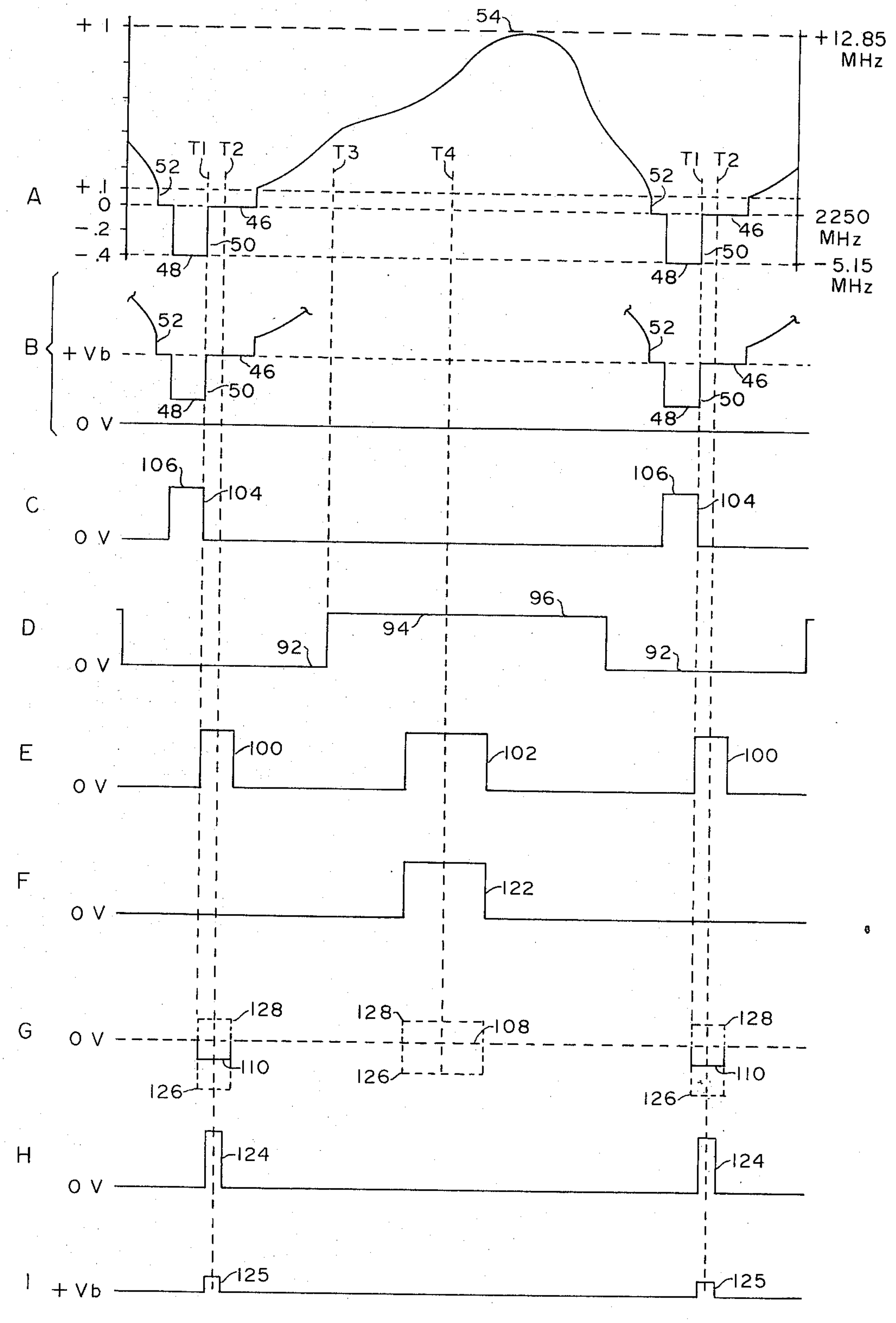
FIG. 2 is a series of waveforms illustrative of the operation of the invention.

The output of voltage controlled oscillator, or V.C.O., 24 of transmitter 18 is connected as an input to a first 225 MHz buffer amplifier 36, in turn having an output coupled to the input of second 225 MHz amplifier 38, and to input 40 of mixer 20. The output of amplifier 38 is, in turn, connected as an input to timesten frequency multiplier 42 which outputs a carrier frequency of 2,250 MHz. This 2,250 MHz carrier is then fed through band-pass filter 44, which reduces the spurious, or undesired, sideband frequencies present at the output of frequency multiplier 42 to provide a clean transmitter output. Waveform A of FIG. 2 is a plot of time versus voltage at the input of video amplifier 26 and the resultant deviation in carrier frequency of transmitter 18 during any one horizontal scanning period. The back porch 46 of the composite video signal is clamped to a zero volt reference which also represents a quiescent carrier output frequency of 2250 MHz. The negative peak 48 of sync pulses 50 is 0.4 volts which results in a negative shift of 5.15 MHz of the 2,250 MHz carrier.

Blanking pedestal 52 occurs between an input of +0.1 and zero volts which is the black or blanking level of the input video, also designated as the retrace interval. A +1 volt input is required for a maximum white level 54 and results in a +12.85 MHz shift of the carrier.

The input of voltage controlled oscillator 24 is clamped by frequency corrector 14, in a manner to be further described, to a voltage which corrects for deviations of oscillator 24 from the desired frequency of 225 MHz (the output frequency 2,250 MHz divided by 10) when the video input is 0 volts, and during an interval coincident with the back porch 46 of the video signal.

Sync clipper 34 of control 16 strips the horizontal and vertical synchronizing pulses from the incoming video signal which are then coupled as clocking pulses to the input of switching pulse generator 56, having outputs 58, 60 and 62 coupled to control inputs 64, 66 and 68 of switches 70, 72 and 74, respectively, or corrector 14, and having output 76 coupled to control input 78 of sample and clamp switch 22.

Reference standard 12 includes 45 MHz crystal oscillator 80, the output of which is coupled to times-four multiplier 82, and to the normally open input 84 of switch 70 of frequency corrector 14. The output of multiplifer 82 is, in turn, amplified by 180 MHz amplifier 86 and coupled to a second input 88 of mixer 20.

The resultant output frequency of mixer 20 is thus the difference between the 180 MHz reference frequency and the output of 225 MHz amplifier 36. This output is also 45 MHz, assuming that the output of V.C.O. 24 is 225 MHz. Any deviation of voltage controlled oscillator 24 from 225 MHz produces a proportional change in the 45 MHz output of mixer 20, which is coupled to the normally closed input 90 of R.F. type switch 70, of corrector 14.

This signal and the 45 MHz signal from reference crystal oscillator 80 are alternately sampled for approximately one-half of each horizontal scanning period, by switch 70, having control input 64 connected to output 58 of pulse generator 56. With 0 volts applied to control input 64, (Waveform D), switch 70 samples the output of mixer 20, through normally closed input 90, for approximately a half horizontal sweep period, that is, a 32 microsecond interval 92, centered about back porch 46 of the video signal. During the intermediate 32 microsecond interval 94 (Waveform D) centered about the midpoint of each horizontal sync period, designated $T_4$, a positive pulse 96 from output 58 of pulse generator 56 enables switch 70 to sample the output of reference oscillator 80 through normally open input 84.

The output of switch 70 is coupled through 45 MHz discriminator stage 98 to the input of a second R.F. type, normally open switch 72. Switch 72 is closed for two intervals during each horizontal scan by positive pulses 100 and 102 from pulse generator 56, (Waveform E).

Pulse 100, of 3.5 microseconds duration, is initiated by the trailing edge 104 of each sync pulse 106 at time $T_1$ (Waveform C).

The second pulse, pulse 102, is 7.5 microseconds in width, and is centered about the midpoint of 32 microseconds sampling interval 94 (Waveform D).

Switch 72 provides sampled outputs 108 and 110 (Waveform G), being outputs of discriminator 98 responsive to the frequency of reference oscillator 80 and mixer 20, respectively. These sampled outputs are coupled as inputs to amplifier 112. Output 114 is connected across holding capacitor 116 during pulse 96, and output 114 is connected in series with capacitor 116 to input 118 of DC amplifier 120 during sampling interval 92. These alternate circuits, which enable the subtraction of the mixer derived output from the referenced signal derived output, are achieved by the operation of clamp switch 74 which grounds to circuit ground 75 the output side of capacitor 116 responsive to 7.5 microsecond pulse 122 (Waveform F) coincidence with similar pulse 102 applied to sample switch 70 (Waveform E). At other times, the output side of capacitor 116 is connected to input 118 of amplifier 120.

The output of D.C. amplifier 120 is sampled by sample switch 22, being closed by 1.5 microsecond pulse 124 (Waveform H) centered about the midpoint ($T_2$) of 3.5 microsecond discriminator sample pulse 100 (Waveform E). Sample switch 22 feeds the output of amplifier 120 representing the transmitter error to capacitor 30 from which it is applied to the frequency control input of V.C.O. 24.

OPERATION

Initially, the frequency of transmitter 18 is calibrated to 2,250 MHz, as follows.

First, the video signal is removed from the inout of video amplifier 26. Then sample switch 22 and clamp switch 74 of error corrector 14 are enabled by means provided internally of switching pulse generator 56.

Under these conditions, the input of D.C. amplifier 120 is referenced to zero volts through clamp switch 74. The output of amplifier 120 is connected, through sample switch 22, to the input of voltage controlled oscillator 24. Bias adjust 126 of amplifier 120 is then adjusted in the appropriate direction to calibrate oscillator 24 to a frequency of 225 MHz, or the output of transmitter 18 at 2,250 MHz.

Since the output of mixer 20 is now 45 MHz and is coupled through the normally closed input 90 of switch 70 to limiter-discriminator 98, the discriminator may be adjusted for an approximate 0 volt output.

If preferred, switch 70 may be operated in order to connect 45 MHz oscillator 80 to discriminator 98, and then the discriminator is adjusted for zero output.

Once the calibration is complete, each of switches 74, 70 and 22 is returned to a normal operating position, and the video input signal is reconnected.

It is assumed, for the purpose of illustration, that the calibration of voltage controlled oscillator 24 as described above, results in a positive bias voltage ($V_b$) at the otuput of D.C. amplifier 120 as shown in (Waveform B). Accordingly, holding capacitor 30 is charged to this value and holds the charge within very close limits during each horizontal scan interval, since the decay time of capacitor 30 is selected to be about 30 scanning periods.

Since the back porch 46 of the video signal at the input of V.C.O. 24 is referenced to this bias level, the carrier during any back porch interval is unmodulated, or at a frequency of 2,250 MHz.

To examine the operation of automatic frequency control 10, assume initially that discriminator 98 is properly adjusted to provide an output of 0 volts upon receiving a precise 45 MHz signal from reference oscillator 80 (Waveform G). Assume further that the output frequency of V.C.O. 24 has drifted lower in frequency and therefore that the output of mixer 20 has drifted below 45 MHz. During interval 94 (Waveform D) switch 70 is operated to pass the reference signal from oscillator 80 to discriminator 98. There will, accordingly, result a 0 voltage output 108 (Waveform G) of discriminator 98 which will be passed during interval 94 (Waveform D) by switch 72 (Waveform G) to amplifier 112 which in turn applies this potential across capacitor 116 which is at this time connected across the output of amplifier 112 by clamp switch 72. Thereafter the output terminal of capacitor 116 is disconnected from ground 75 and during interval 92 (Waveform D), discriminator 98 is responsive to the assumed "off" frequency output of mixer 20 and thus there is applied to D.C. amplifier 120 the difference between the capacitor voltage being 0 at this time as described above, and output voltage of discriminator 98, being a negative pulse 110, representative of the "off" frequency output of mixer 20. Thus the reference derived capacitor voltage of 0 volts is simply subtracted from the mixer derived discriminator voltage, negative in this case, and the difference voltage is applied to D.C. amplifier 120. Amplifier 120 amplifies the error 110 and reverses its polarity, applying an error correcting pulse 125, Waveform I, through switch 22 to holding capacitor 30. This sequence of sampling of error 110 occurs once for each sync cycle and the voltage thus derived is cyclically fed from amplifier 120 by switch 22 to capacitor 30 and thus to the control input of V.C.O. 24, which causes its frequency to be raised to a correct value of 225 MHz.

If V.C.O. 24 tends to drift higher in frequency, the output of mixer 20 tends to become higher than 45 MHz, resulting in a positive error signal to amplifier 120. Then each time the output is sampled by switch 22, during back porch 46 of video input (Waveform A), a discrete negative pulse, would be applied to holding capacitor 30 to thus cause the frequency of V.C.O. 24 to lower to a correct frequency.

If there is no error in frequency and thus the outputs of discriminator 98 responsive to both the signal from oscillator 80 and mixer 20 are zero, no corrective voltage will be applied by automatic frequency control 10 to V.C.O. 24.

If due to environmental or other effects, the discriminator output should drift, for example in a negative direction, shown by dashed lines 126 (Waveform G), this will, of course, cause a negative voltage to be applied to capacitor 110 during the sampling of reference oscillator 80. Since, however, the same negative drift voltage will also be applied to the discriminator output during the sampling of mixer 20, and the two voltages are subtracted by virtue of the switching of the output terminal of capacitor 110, no net error is introduced by discriminator drift. This is true whether the drift be negative as shown by dashed line 126 or positive as shown by dashed line 128. Thus for example, if it were assumed that discriminator 98 produced a minus 1 volt at a "on" frequency of 45 MHz and the transmitter were "on" frequency there would be a minus 1 volt across capacitor 116 during the effective sampling of referenced oscillator 80 and thereafter with a correct 45 MHz signal from mixer 20, discriminator 98 would also output a minus 1 volt. Since the capacitor voltage is placed in series with the discriminator voltage during error sampling by D.C. amplifier 120 and the latter voltage thus subtracted from the former, a correct 0 volts, indicating a no error condition, is fed to amplifier 120. The same process of elimination of discriminator drift as a factor is applicable when there is an actual error of voltage output representative of an "off" frequency signal from mixer 20. In such case the voltage representative of discriminator drift appears identically in both the reference derived signal and mixer derived signal and are cancelled leaving only a voltage representative of the actual error.

The output frequency stability factor derived from a mathematical model of the FM TV transmitter is presented in the following equation.

$$d_0 = d_R + (dv/K_0) + (dL/5)\,(d_D - d_R) + (1/K_0)\,[K_C d_C + K_B d_B + K_S d_S]$$

Where $d_0$ — OUTPUT FREQUENCY STABILITY FACTOR $K_0$ — OPEN LOOP GAIN ($K_0$ 1)

$d_R$ — REFERENCE OSCILLATOR STABILITY FACTOR $d_V$ — VCO STABILITY FACTOR $d_L$ — LIMITING ERROR FACTOR $d_D$ — DISCRIMINATOR STABILITY FACTOR $K_C d_C$ — CLAMPING ERROR FACTOR $K_B d_B$ — FREQUENCY CONTROL BIAS DRIFT FACTOR $K_S d_S$ — SAMPLING ERROR FACTOR

Thus it is seen that the steady-state frequency stability ($d_0$) is a function of the following factors:

1. The stability factor $d_R$ of the reference oscillator;

2. The term $dv/K_0$ representing the stability factor of the V.C.O. divided by the open loop gain;

3. The disturbance term $(dL/5)\,(d_D - d_R)$ resulting from imperfect limiting which causes the discriminator zero drift to affect the stability, although this factor is reduced by the down conversion ratio;

4. The disturbance term, $(1/K_0)[K_C d_C + K_B d_B + K_S d_S]$, representing clamping inaccuracy, frequency control bias voltage drift and sampling error.

The actual effect of these factors is not large and in practice the carrier frequency of a transmitter controlled in frequency by the invention may be held to within less than 0.01 percent of the desired frequency.

What is claimed is:

1. An automatic frequency control for an F.M. radio frequency transmitter which transmits a signal having a periodically recurring period in which a constant frequency is generated, comprising:

reference frequency signal generating means for generating a stable signal at a selected frequency:

signal means responsive to the frequency of said transmitter for providing a frequency output corresponding to said selected frequency when said transmitter is "on" frequency:

discriminating means responsive to an input signal for providing a pulse output of a polarity representative of whether an input signal is above or below said selected frequency and of a magnitude proportional to the magnitude that the input signal deviates from said selected signal:

switching means for selectively feeding said output of said signal means to said discriminating means during said periodically recurring periods and for feeding the output of said reference frequency signal generating means to said discriminating means between said periods:

difference means, including means for temporarily storing the output of said discriminating means responsive to one of its signal inputs, for providing an error signal representative of the difference between outputs of said discriminating means responsive to successive signals from said reference frequency signal generating means and said signal means, respectively; and coupling means responsive to said difference means for applying said error signal to said transmitter for correcting its frequency.

2. An automatic frequency control as set forth in claim 1 further comprising a long time-constant capacitor adapted to feed a video, frequency modulating, signal to said transmitter and said coupling means comprises means for feeding said error signal to the output side of said capacitor.

3. An automatic frequency control as set forth in claim 2 wherein said difference means comprising:

a second capacitor having an input terminal coupled to the output of said discriminating means and an output terminal connected to said coupling means; and second switching means for connecting said output terminal of said second capacitor to ground for the said temporarily storing of the output of said discriminating means for a discrete period;

whereby said second capacitor is charged to a value of one of its signal inputs when said output terminal of said second capacitor is grounded, and thereafter with said output terminal ungrounded and with the occurrence of the other of the signal inputs to said discriminating means, the resulting signal output is combined with the stored voltage across said second capacitor as an error voltage to said coupling means and to said long time-constant capacitor.

4. An automatic frequency control as set forth in claim 3 wherein said voltage temporarily stored across said second capacitor is a voltage provided responsive to said reference frequency signal generating means.

5. An automatic frequency control as set forth in claim 4 further comprising:

a video signal source adapted to provide a video signal with periodic synchronizing pulse outputs during retrace intervals and its circuit output is connected to the input terminal of said long time-constant capacitor;

third switching means for selectively coupling the output of said discriminating means to the input of said second capacitor; and switching control means responsive to said synchronizing pulse outputs of said video signal source for controlling said switching means, said second switching means, and said third switching means, whereby:

the signal output of said dicriminating means responsive to the output of said reference frequency signal generating means is applied through said third switching means across said capacitor to ground through said second switching means during a selected period between said periodically recurring periods; and said signal from said signal means is connected through said switching means to said discriminating means and the responsive output of said discriminating means is connected through said third switching means in series with said second capacitor to said coupling means during said periodically recurring periods corresponding to a portion of each retrace interval of said video signal.

6. An automatic frequency control as set forth in claim 5 wherein said recurring periods correspond to the "back porch" portion of the retrace interval portion of said video signal.

7. An automatic frequency control as set forth in claim 6 further comprising fourth switching means connected in circuit with said coupling means and said switching control means includes means coupled to said fourth switching means for operating said fourth switching means for selectively coupling the said error signal to the output side of said long time-constant capacitor only during a portion of each said "back porch" portion of said video signal.

* * * * *